(12) United States Patent
Woehler

(10) Patent No.: US 7,634,184 B2
(45) Date of Patent: Dec. 15, 2009

(54) DIGITAL CAMERA WITH TILTABLE IMAGE SENSOR

(76) Inventor: Christian Woehler, Wilhelmstr. 8, Heidelberg (DE) 69115

( * ) Notice: Subject to any disclaimer, the term of this patent is extended or adjusted under 35 U.S.C. 154(b) by 242 days.

(21) Appl. No.: 11/515,336

(22) Filed: Aug. 31, 2006

(65) Prior Publication Data

US 2007/0071429 A1    Mar. 29, 2007

(30) Foreign Application Priority Data

Aug. 31, 2005    (DE) ............... 10 2005 041 431

(51) Int. Cl.
   *G03B 13/32*    (2006.01)
(52) U.S. Cl. .................. 396/89; 348/294
(58) Field of Classification Search .......... 396/89; 348/294
   See application file for complete search history.

(56) References Cited

U.S. PATENT DOCUMENTS

| | | | |
|---|---|---|---|
| 4,564,277 A | | 1/1986 | Koch et al. |
| 4,786,934 A | | 11/1988 | Kunze et al. |
| 5,453,784 A | * | 9/1995 | Krishnan et al. ............ 348/348 |
| 6,072,529 A | * | 6/2000 | Mutze ........................ 348/351 |
| 6,141,051 A | * | 10/2000 | Koch et al. .................. 348/345 |
| 6,567,126 B1 | * | 5/2003 | Slatter et al. ................ 348/345 |
| 6,671,397 B1 | | 12/2003 | Mahon et al. |
| 7,064,789 B1 | * | 6/2006 | Shono ........................ 348/351 |
| 2002/0021897 A1 | | 2/2002 | Nakata |
| 2002/0080242 A1 | * | 6/2002 | Takahashi et al. ........... 348/208 |
| 2003/0011747 A1 | | 1/2003 | Lenz |

FOREIGN PATENT DOCUMENTS

| | | |
|---|---|---|
| DE | 36 37 742 C2 | 12/1990 |
| DE | 34 33 412 C3 | 4/1995 |
| DE | 196 37 629 A1 | 3/1998 |
| DE | 101 32 624 A 1 | 1/2002 |

OTHER PUBLICATIONS

Brochure "Sinar Fachkameras", No. 689.98/07.77.003 d, Sinar AG, Switzerland, 1998, pp. 1-1, 1-2, and 1-4.

* cited by examiner

*Primary Examiner*—Melissa J. Koval
*Assistant Examiner*—Fang-Chi Chang
(74) *Attorney, Agent, or Firm*—Jurgen Vollrath

(57) ABSTRACT

The invention relates to a camera for generating digital images with an image sensor that is configured to convert an image formed by a lens into electronic signals. The digital camera is characterized by that the image sensor is attached to a movement element with a controllable drive, the movement element rendering the image sensor tiltable so that an angle between the axis of the lens and a plane of the image sensor is modifiable.

12 Claims, 5 Drawing Sheets

DIGITAL CAMERA WITH TILTABLE IMAGE SENSOR

CROSS-REFERENCES TO RELATED APPLICATIONS

This application claims priority to German Patent Application No. 10 2005 041 431.1-51, filed on Aug. 31, 2005, and entitled "Digitale Kamera mit verschwenkbaren Bildsensor," which is incorporated herein by reference for all purposes.

FIELD OF THE INVENTION

The invention relates to a camera for generating digital images.

BACKGROUND

In recent years the spreading of digital cameras has increased. A digital camera has an image sensor that has the ability to record light beams and convert them into electrical signals. Examples for an image sensor are charge coupled devices (CCD) semiconductor detectors or complementary metal oxide semiconductors (CMOS) elements. A processing of the electrical signals allows for a representation of the recorded light beams in a format of electronic data. In case that an image is formed on a light sensitive layer the image may for example be stored in an electronic file. The electronic file may have a standard format so that the electronic file is transferable to a computer and displayable on a monitor using a suitable program.

The digital camera includes a lens that forms an image. An image area is sharply focused on the image sensor in case that the image area can be perceived as sharp in a representation following a processing. A sharp perception depends on the requirements for the representation and is influenced by further properties of the total optical system as for example by the resolution of the image sensor. According to the requirements there is a volume of sharp focus that includes a plane of sharp focus. Objects that are within the volume of sharp focus may be formed in a sharp way on the image sensor by the lens, that is, that the image of the objects is focused sharply on the image sensor. In case that the longitudinal axis of the lens is perpendicular, that is orthogonal, to the image sensor the plane of sharp focus is also perpendicular to the longitudinal axis and therefore parallel to the image sensor. This is the case in most digital cameras. In certain situations a plane of sharp focus that is not perpendicular to the longitudinal axis of the lens may be desirable. Cameras with a tilt lens have a lens that is tiltable and a plane of sharp focus may be obtained that is tilted with regards to the longitudinal axis of the lens. Such tilt lenses are mechanically complex and expensive to manufacture. They are specialty lenses that are offered only in few focal distances. Furthermore, a sharp focusing of a large image area may be difficult due to missing options to control the sharpness and automated adjustments. There are further large format cameras with a movable center piece. The movable center piece allows for a tilting of standard lenses. Such large format cameras are also mechanically very complex, expensive to manufacture, and involved when used. A sharp focusing is possible but complex.

SUMMARY

An object of the invention is a flexible digital camera with a plane of sharp focus that is tiltable with regards to the longitudinal axis of the lens.

Accordingly a digital camera is disclosed in claim 1. The disclosed digital camera has an image sensor that is tiltable with regards to the longitudinal axis of the lens. A tilting of the image sensor leads to a desired tilt of the plane of sharp focus with regards to the longitudinal axis of the lens. The disclosed camera is flexible because it can be used with a standard lens and its operation is easy. Furthermore, the disclosed camera is robust because internal components are tiltable. The disclosed camera can be manufactured without a large increase in proportions or weight compared to a conventional digital camera without the inventive characteristics. Furthermore, the disclosed camera can be manufactured cost-efficiently.

Further embodiments of the digital camera are disclosed in following claims that depend on claim 1.

DETAILED DESCRIPTION OF THE FIGURES

Figure 1:
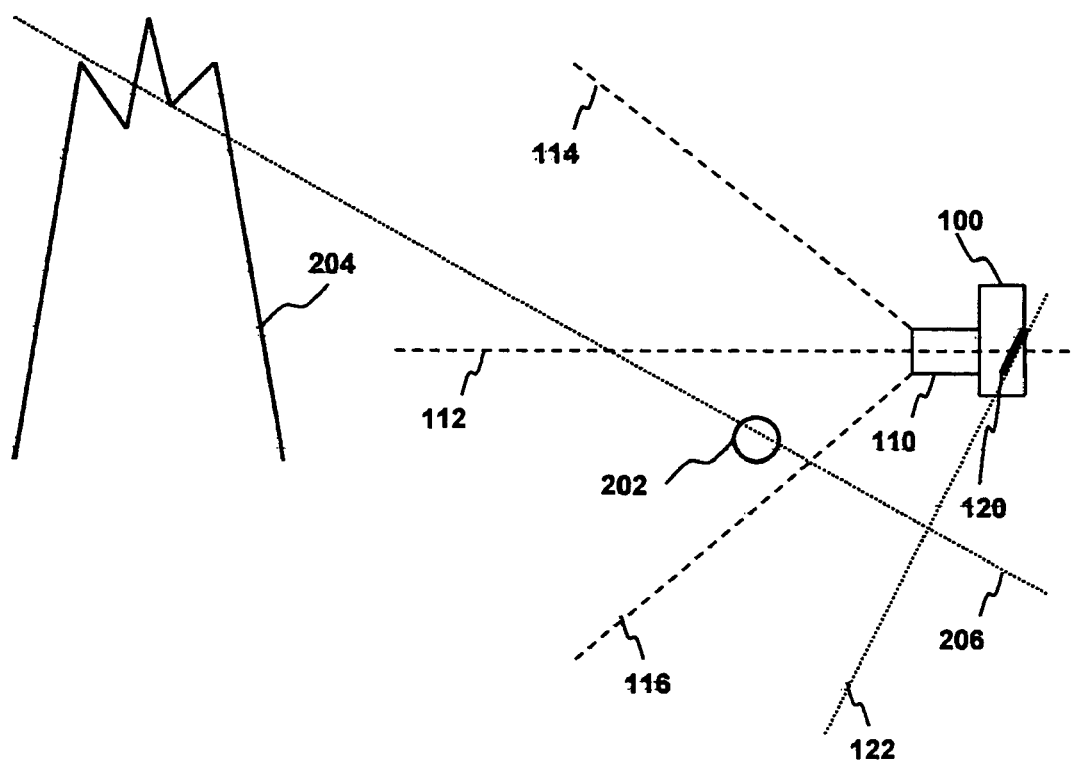
FIG. 1 shows an example digital camera with a tilted image sensor and an accordingly tilted plane of sharp focus.

FIG. 1 shows an example digital camera 100 with a tilted image sensor 120 and an accordingly tilted plane 206 of sharp focus. The figure is not drawn to scale. The digital camera 100 is configured to generate digital images using the image sensor 120 that is configured to convert an image from a lens 110 into electrical signals. The image sensor is attached to a movement element having a controllable drive, wherein the movement element renders the image sensor tiltable so that an angle between an axis 112 of the lens and a plane 122 of the image sensor is modifiable. The movement element includes the controllable drive and is controllable by the drive. A controlling of the movement element by the drive may be obtained for example using electrical signals to the drive or the movement element. The movement element may for example convert the electrical signals so that they may be used to control the drive. The electrical signals may control the drive to mechanically move the movement element leading to an according tilting of the image sensor. The axis 112 of the lens is the longitudinal axis of the lens. The tilted plane of sharp focus 206 and the plane 122 of the image sensor meet in a line that is represented in FIG. 1 as a point. According to the Scheimpflug principle, in this line also meets a lens plane that is perpendicular to the axis 112 of the lens. The line is also called Scheimpflug line. In case of a non-tilted image sensor, meaning an image sensor perpendicular to the axis 112 of the lens the plane of sharp focus 206 is parallel to the plane 122 of the image sensor and the Scheimpflug line may be described as being located infinitely far away.

An opening angle of the lens is represented by a top opening line 114 and a bottom opening line 116. The lens produces an image of objects within the opening angle. Accordingly, the lens produces an image of a near object 202 and a far object 204. The near object 202 is for example a ball in a distance of 2 meters and the far object 204 is for example a mountain range in a distance of 5000 meters. The plane of sharp focus cuts the near object 202 and the far object 204. With an appropriate opening of the aperture follows a volume of sharp focus that includes the near object and the far object. Therefore, with an appropriate opening of the aperture the near object and the far object may be in sharp focus. With an untilted image sensor such focusing is not obtainable and the near object and the far object may be formed with reduced image quality by using a small aperture. For the mentioned example of the 5000 meters far away mountain range and of the 2 meters far away ball an approximate tilt of the image sensor may be calculated using the lens equation, also called thin lens formula. The lens equation is: the sum of reciprocal value of object distance to lens and reciprocal value of image distance to lens is equal to the reciprocal value of the focal length of the lens. In case of for example a focal length of the lens of 20 millimeters and a distance between the images of the near object and the far object of 10 millimeter on the image sensor follows a tilt of approximately 1.1 degrees compared to a perpendicular image sensor.

The digital camera 100 may for example be a digital single lens reflex camera, a digital view finder camera, a digital camera without a view finder, or a camera with a digital back. The lens may for example be a lens with a fixed focal length or a zoom lens. The lens may be also a macro lens and for a macro photo the difference between the distances of a near and a far object may be a few centimeters.

Figure 2A:
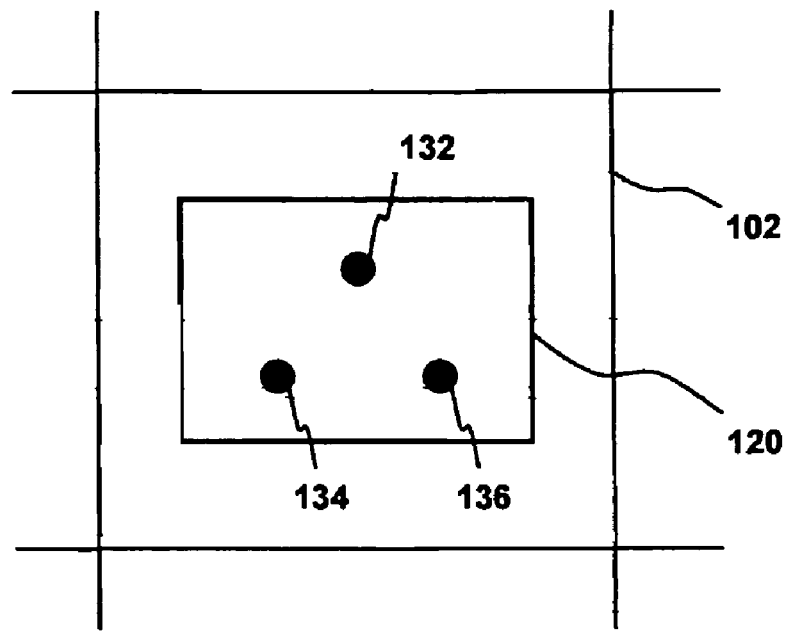
FIG. 2A is a front view of an embodiment of a movement element.

FIG. 2A is a front view of an embodiment of a movement element. The drive of the movement element consists of units 132, 134, 136. The image sensor 120 is attached to a platform and the units connect the platform with a rear panel of the 102 of a digital camera. The platform is a part of the movement element. The units 132, 134, 136 may be attached in a flexible way to the platform so that the angles between the units and the platform is modifiable. The units may be also attached to the rear panel in a flexible way. In a further embodiment the number of units may be larger of smaller. Furthermore, an embodiment may enable a tilt of the image sensor only in one direction. Such an embodiment may be obtained with one unit and for example a hinge.

Figure 2B:
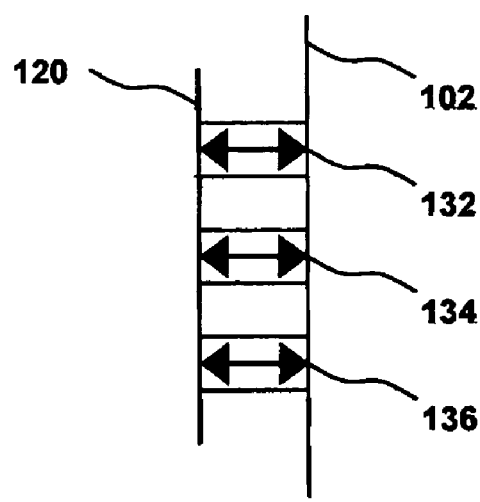
FIG. 2B is a side view of the embodiment of a movement element.

FIG. 2B is a side view of the embodiment of a movement element. The side view is such that the units 132, 134, 136 are visible. The units may change their length in the indicated direction. Therefore a tilt of the image sensor 120 may be obtained in any direction. There are many possibilities to embody a unit with a modifiable length. As an example, a piezo-electric element may change its length when a voltage is impressed on it. In a further example, the unit may include a small electric motor that turns a threaded spindle so that the distance between an end of the threaded spindle and a mount of the threaded spindle changes leading to a change of the length of the unit. Electric wires for controlling the units are not shown in the figures (FIG. 2A and FIG. 2B).

Figure 3A:
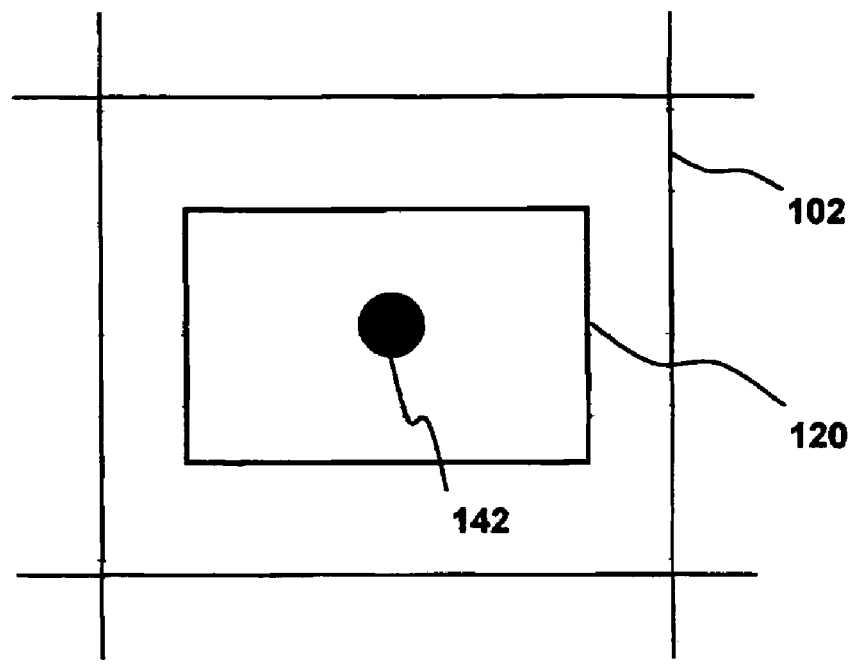
FIG. 3A is a front view of a further embodiment of a movement element.

FIG. 3A is a front view of a further embodiment of a movement element. In the further embodiment an attachment element 142 is attached to the image sensor 120. Behind the image sensor is in front of the rear panel 102 of the digital camera.

Figure 3B:
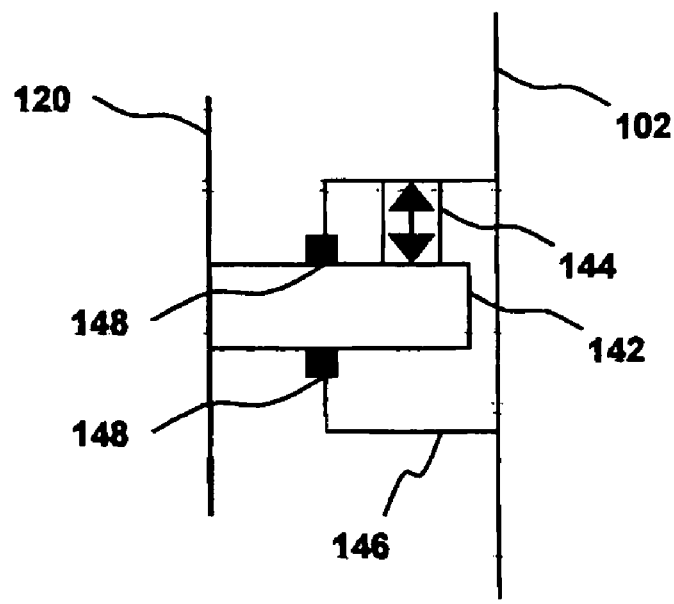
FIG. 3B is a side view of the further embodiment of a movement element.

FIG. 3B is a side view of the further embodiment of a movement element. The attachment element 142 is held movable in an attachment housing 146 by a mounting 148 so that the longitudinal axis of the attachment element 142 is tiltable. A tilt in the vertical direction is controlled through a unit 144 that is part of the controllable drive and that has a modifiable length in the indicated vertical direction. A tilt in the horizontal direction may be controlled by a further, not displayed unit with modifiable length. The further unit may be for example turned by 90 degrees around the longitudinal axis of the attachment element 142 compared to the unit 144. The unit 144 with a modifiable length may have embodiments that have been represented and described in a previous figure (FIG. 2B). The movement element includes the attachment element 142, the attachment housing 146, the mounting 148 and the unit 144. A further embodiment of a controllable drive for controlling a mechanical movement of the movement element is an ultra sonic motor. Ultra sonic motors are known to a person skilled in the art from lens focusing. Furthermore, a movement element may be moved by a purely mechanical drive. The purely mechanical drive may for example convert a turning of a steering wheel by a user into a mechanical movement of the movement element. The drive should allow for a very precise adjustment by the mechanical components because a precise adjustability of the movement element is desirable.

Figure 4:
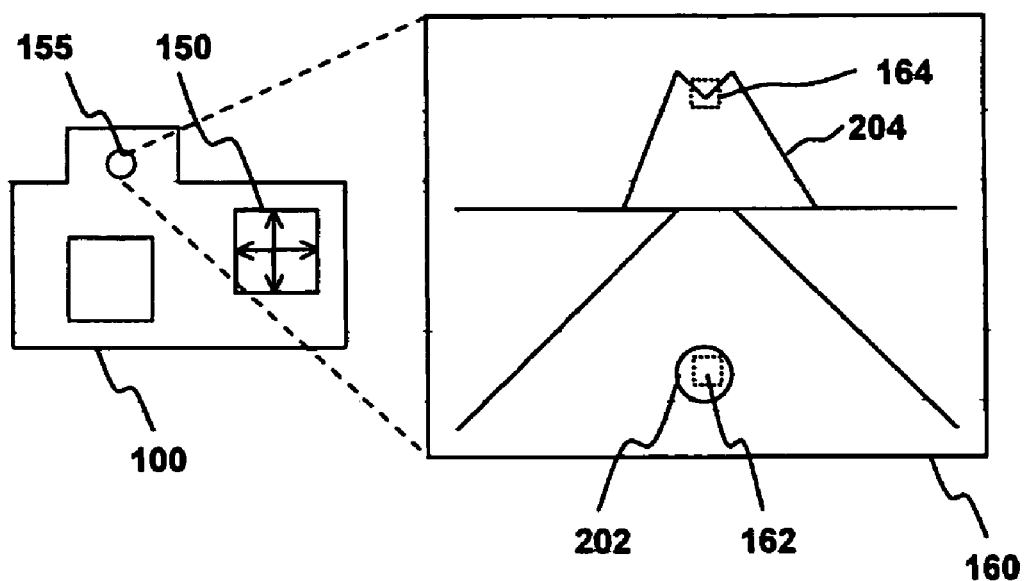
FIG. 4 is an example digital camera with a display of an image with marked autofocus areas.

FIG. 4 is an example digital camera 100 with a display 160 of an image with marked autofocus areas 162 and 164. The example camera 100 is a digital single lens reflex camera with an additional autofocus element that is configured to determine from a distance measurement of an area a focus value of the lens and a tilt of the image sensor so that the area is sharply focused on the image sensor. The area may consist of one or more partial areas that may be separate or connected. The area may consist for example of 45 autofocus points that determine the distance in 45 different partial areas. The autofocus points may be evenly distributed like a lattice over the whole area that is imaged by the lens on the image sensor. In a further example the distribution may deviate from the lattice structure. A person skilled in the art knows different embodiments of autofocus elements. There are active autofocus elements that measure for example the reflection of infra red light and there are passive autofocus elements. The autofocus elements may for example determine the distance by contrast comparison. The contrast comparison may be used for example with digital view finder cameras. The passive autofocus elements may determine the distance also for example by phase comparison. The phase comparison may be used for example with digital single lens reflex cameras.

The camera 100 has a finder 155 in which the focusable area is visually marked in a display 160 of an image for a user. In the example are two visually marked focusable areas 162 and 164. The area 162 includes a part of the near object 202 and the area 164 includes a part of the far object 204. Both areas 162 and 164 may be focused in a sharp way on the image sensor in accordance with the focus or distance value of the lens, the tilt of the camera, and the distances measured by the autofocus elements. Therefore, both areas 162 and 164 will be formed as sharp images on the light sensitive layer of the image sensor when the shutter is opened or an exposure of the camera is triggered. In a further camera with multiple autofocus points a larger number of sharply focusable areas may be marked according to the circumstances.

Furthermore, the camera 100 has a further provision for inputting a target area, wherein the autofocus element aims for sharply focusing the target area on the image sensor by a distance measurement of the target area, an according adjustment of the focus of the lens, and an according tilt of the image sensor. In a further embodiment, the autofocus element may also determine the aperture value so that the target area is sharply focused on the image sensor. By adjusting the aperture value the thickness of the volume of sharp focus is determined, that is, the objects that are focused in a sharp way and that are outside of the plane of sharp focus.

Furthermore, the camera 100 has a further control element 150 with which the tilt of the image sensor is controllable by a user. With the control element a user may adjust the tilt manually. The user may move a button or a stick to the top, bottom, left, or right and such an adjustment is mapped to a corresponding tilt of the image sensor. In an example, a movement of the button may lead to a tilt wherein the top edge of the image sensor is tilted to the front. A movement of the button to the left may for example lead to a tilt wherein the left edge of the image sensor is tilted to the front. The user may see the effects of the tilt on the areas that are sharply focused on the display 160 for example by using the marked areas that may be sharply focusable. The control element 150 may also be used for example to determine one or more target areas by separately moving each target area with the button in the display.

The camera 100 is a digital single lens reflex camera that allows for a representation of the display 160 through the view finder. With a digital camera of a different type, for example a digital view finder camera or a digital compact camera the display 160 may be represented for example by a liquid crystal display (LCD) monitor. The LCD monitor may receive a part of the information of the display 160 from the image sensor.

Figure 5:
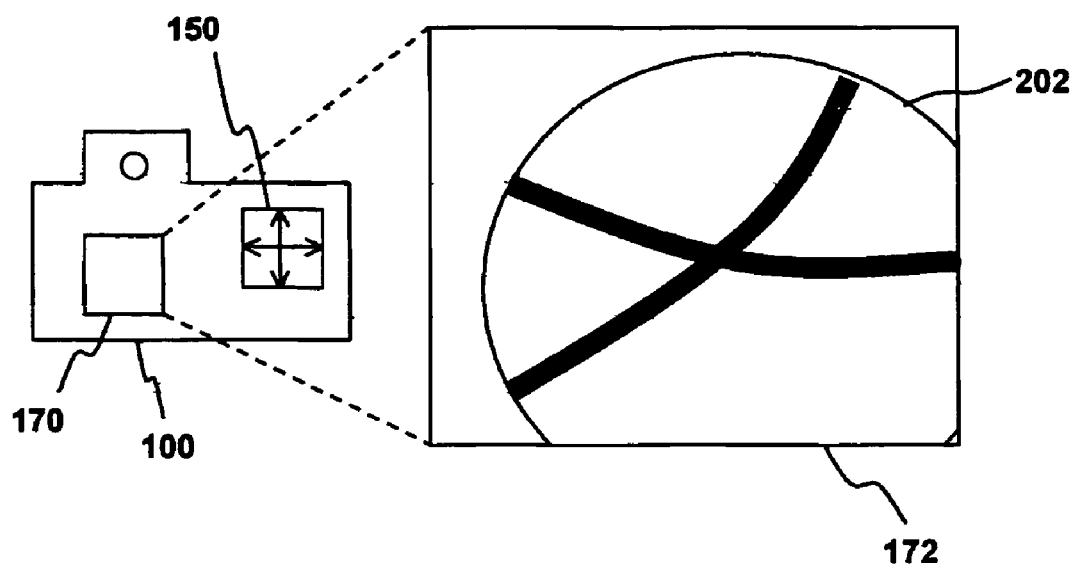
FIG. 5 is an example digital camera with a display of a control area.

FIG. 5 is an example digital camera 100 with a display of a control area 172. The control area 172 of the camera 100 permits a visual control of the focus by the user. The control area is represented in the figure by a LCD monitor 170. In a further embodiment of the digital camera the control area may be also represented in the view finder for example as a split circle or split screen. For a digital single lens reflex camera the LCD monitor 170 may represent the representation 172 following an exposure of the image sensor. The user may take for example a test photo, let one or more control areas be displayed to check the sharpness of the control areas, and take a further photo following a change of the tilt. The representation 172 shows the near object 202 (see FIG. 1) that is a ball in an enlargement so that a sharp focusing may be verified. The user may for example use the control element 150 to move the control area or jump to a further, predefined control area to check the focusing for the further control area.

The digital camera 100 permits with regards to the tilt of the image sensor a manual manipulation through which the tilt is controllable by the control element. Furthermore, the digital camera permits an automated tilt that is determined by aiming for a sharp focusing of as many areas as possible or of large areas. The automated tilt may be controlled by the camera without the user for example influencing the adjustments or perceiving the tilt. However, the user may be able to see the enhanced area of sharpness in a representation of the image when the image composition permits it.

The invention claimed is:

1. A camera for generating digital images, comprising: an image sensor configured to convert an image formed by a lens into electronic signals;
   a movement element to which the image sensor is attached, the movement element having a controllable drive and rendering the image sensor tiltable so that an angle between the axis of the lens and a plane of the image sensor is modifiable;
   an autofocus element configured to determine from a distance measurement of an area a focus value of the lens and a tilt of the image sensor so that the area is sharply focusable onto the image sensor; and
   a display configured to display the image in which at least one focusable area is visually marked for a user of the camera, the focusable area being determined as being in focus on the image sensor according to the focus value of the lens as determined by the autofocus element, the tilt of the image sensor as determined by the autofocus element, and distances measured by the autofocus element.

2. Camera according to claim 1, having a further provision for inputting a target area, wherein the autofocus element from a distance measurement of the target area aims for a tilt of the image sensor that renders the target area sharply focusable on the image sensor.

3. The camera of claim 2, wherein the autofocus element is further configured to determine the aperture value so that the target area is sharply focusable on the image sensor.

4. The camera of claim 1 with a further control element with which a tilt of the image sensor is controllable by a user, the control element, which includes a button or stick, being moveable to the top, bottom, left, and right and being configured to tilt the image sensor in response to movement of the control element.

5. The camera of claim 4, wherein an effect of the tilt of the image sensor on the at least one focusable area is displayed to the user.

6. Camera according to claim 1, further with at least one control area that permits a visual control of the focus by the user displaying the least one control area in an enlargement.

7. A camera for generating digital images, comprising:
   an image sensor configured to convert an image formed by a lens into electronic signals;
   a movement element to which the image sensor is attached, the movement element having a controllable drive and rendering the image sensor tiltable so that an angle between the axis of the lens and a plane of the image sensor is modifiable;
   an autofocus element configured to determine from a distance measurement of an area a focus value of the lens and a tilt of the image sensor so that the area is sharply focusable onto the image sensor; and
   at least one control area that permits a visual control of a focus by the user by displaying the at least one control area in an enlargement, wherein a focusable area is visually marked in a display of the image for a user of the camera, the focusable area being determined as focusable on the image sensor according to the focus value of the lens as determined by the autofocus element, the tilt of the image sensor as determined by the autofocus element, and distances measured by the autofocus element.

8. The camera of claim 7, further comprising a provision for inputting a target area, wherein the autofocus element from a distance measurement of the target area aims for a tilt of the image sensor that renders the target area sharply focusable on the image sensor.

9. The camera of claim 7, further comprising a control element with which a tilt of the image sensor is controllable by a user, the control element, which includes a button or stick, being moveable to the top, bottom, left, and right and being configured to tilt the image sensor in response to movement of the control element.

10. A camera for generating digital images, comprising:
   an image sensor configured to convert an image formed by a lens into electronic signals;
   a movement element to which the image sensor is attached, the movement element having a controllable drive and rendering the image sensor tiltable so that an angle between the axis of the lens and a plane of the image sensor is modifiable;
   an autofocus element configured to determine from distance measurements of more than one partial area a focus value of the lens and a tilt of the image sensor so that the more than one partial areas are sharply focusable onto the image sensor; and a control element with which a tilt of the image sensor is controllable by a user, the control element, which includes a button or stick, being moveable to the top, bottom, left, and right and being configured to tilt the image sensor in response to movement of the control element, wherein a focusable area is visually marked in a display of the image for a user of the camera, the focusable area being determined as focusable on the image sensor according to the focus value of the lens determined by the autofocus element, the tilt of the image sensor determined by the autofocus element, and distances measured by the autofocus element.

11. The camera of claim 10, further comprising a provision for inputting a target area, wherein the autofocus element from a distance measurement of the target area aims for a tilt of the image sensor that renders the target area sharply focusable on the image sensor.

12. The camera of claim 10, further comprising at least one control area that permits a visual control of the focus by the user by displaying the at least one control area in an enlargement.

* * * * *